(12) United States Patent
Lv et al.

(10) Patent No.: US 12,734,684 B2
(45) Date of Patent: Sep. 15, 2026

(54) FUSION SYSTEM OF MECHANICAL ARM AND DEXTEROUS HAND, AND MOTION CONTROL METHOD

(71) Applicant: Beijing Institute of Precision Mechatronics and Controls, Beijing (CN)

(72) Inventors: Bohan Lv, Beijing (CN); Si Zeng, Beijing (CN); Shoujun Zhao, Beijing (CN); Zhihong Chen, Beijing (CN); Yue Zhong, Beijing (CN); Shan Liu, Beijing (CN); Junning Zhang, Beijing (CN); Yajing Guo, Beijing (CN); Shuxuan Liu, Beijing (CN); Fan Yang, Beijing (CN); Hao Wang, Beijing (CN)

(73) Assignee: Beijing Institute of Precision Mechatronics and Controls, Beijing (CN)

( * ) Notice: Subject to any disclaimer, the term of this patent is extended or adjusted under 35 U.S.C. 154(b) by 77 days.

(21) Appl. No.: 18/846,554

(22) PCT Filed: Nov. 4, 2022

(86) PCT No.: PCT/CN2022/129938
§ 371 (c)(1),
(2) Date: Sep. 12, 2024

(87) PCT Pub. No.: WO2023/173764
PCT Pub. Date: Sep. 21, 2023

(65) Prior Publication Data

US 2025/0196336 A1 Jun. 19, 2025

(30) Foreign Application Priority Data

Mar. 14, 2022 (CN) ......................... 202210248880.9

(51) Int. Cl.
*B25J 9/16* (2006.01)
*B25J 9/12* (2006.01)
(Continued)

(52) U.S. Cl.
CPC ............... *B25J 9/1612* (2013.01); *B25J 9/12* (2013.01); *B25J 9/1607* (2013.01); *B25J 15/0009* (2013.01); *B25J 17/0266* (2013.01)

(58) Field of Classification Search
CPC . B25J 9/1612; B25J 9/12; B25J 9/1607; B25J 15/0009; B25J 17/0266; B25J 9/003; B25J 9/1628; B25J 17/02
See application file for complete search history.

(56) References Cited

U.S. PATENT DOCUMENTS

2018/0267690 A1* 9/2018 Kemp ...................... B25J 5/007

FOREIGN PATENT DOCUMENTS

| | | | |
|---|---|---|---|
| CN | 108673509 | A | 10/2018 |
| CN | 109397271 | A | 3/2019 |
| CN | 109822557 | A | 5/2019 |

OTHER PUBLICATIONS

Written Opinion and International Search Report of corresponding PCT/CN2022/129938, mailed Jan. 17, 2023 (English and Chinese language documents) (19 pages).

* cited by examiner

*Primary Examiner* — Michael C Zarroli
(74) *Attorney, Agent, or Firm* — Maginot, Moore & Beck LLP

(57) ABSTRACT

A fusion system of a mechanical arm and a dexterous hand includes a four-degree-of-freedom mechanical arm, a dexterous hand wrist mounted at the tail end of the mechanical arm, and a dexterous hand mounted on the dexterous hand wrist. The dexterous hand wrist is a single-joint spatial orthogonal two-degree-of-freedom wrist. In a motion con- (Continued)

trol method, the fusion system is regarded as a six-axis series mechanical arm. A forward kinematics method obtains a position and an attitude of the tail end of the dexterous hand wrist based on a joint angle, and an inverse kinematics numerical solution method obtains the joint angle based on the position and attitude to drive the tail end to a preset position and attitude. The six-degree-of-freedom series-parallel mechanism has multi-degree-of-freedom redundancy to allow rotation of the five-finger dexterous hand without a wide-range motion of the mechanical arm.

3 Claims, 2 Drawing Sheets

(51) Int. Cl.

*B25J 15/00* (2006.01)

*B25J 17/02* (2006.01)

FUSION SYSTEM OF MECHANICAL ARM AND DEXTEROUS HAND, AND MOTION CONTROL METHOD

CROSS-REFERENCE TO RELATED APPLICATION

The present application is a 35 U.S.C. § 371 National Stage Application of PCT/CN2022/129938, filed on Nov. 4, 2022, which claims the priority of a Chinese Patent Application filed with China National Intellectual Property Administration on Mar. 14, 2022, Application No. 202210248880.9, titled "a fusion system of a mechanical arm and a dexterous hand and a motion control method", the entire contents of which are incorporated by reference in the present application.

FIELD

The present disclosure belongs to the field of robot motion control, and relates to a fusion system of a four-degree-of-freedom mechanical arm and a dexterous hand and a motion control method.

BACKGROUND

As an executive component of a robot for interaction with the environment, a large-grip multi-degree-of-freedom full-drive humanoid dexterous hand is very important for the improvement of the intelligent level of the robot. Simply with the humanoid dexterous hand, it is still unable to complete the fine operation task independently, and a mechanical arm is needed as a carrier of the dexterous hand, so a fusion system of the mechanical arm and the dexterous hand and a motion control method are the key technologies to realize the intelligent and dexterous operation of the robot.

The research and development level of the domestic large-grip multi-degree-of-freedom full-drive humanoid dexterous hand is still in its infancy, and the existing products are mostly single-degree-of-freedom claws or six-degree-of-freedom, twelve-degree-of-freedom under-driven dexterous hands, and cannot completely imitate the human hand for fine operation.

At present, the popular way of combining an arm and a hand at home and abroad is a six or seven degrees of freedom mechanical arm plus an end claw or six or twelve degrees of freedom dexterous hand. In this combination mode, the mechanical arm and the dexterous hand are controlled separately, and no joint control is realized, and there is no arm-hand fusion control.

At present, the combination of the existing mechanical arm and the claw often does not have a link of a wrist or adopts a joint of the mechanical arm to replace the function of the wrist, which is neither beautiful nor practical. There is no orthogonal dual-degree-of-freedom wrist control method in traditional techniques. There is no good control method for a four-degree-of-freedom mechanical arm and a dexterous hand wrist, which is a series-parallel fusion system with four degrees of freedom plus two degrees of freedom. The four-degree-of-freedom mechanical arm and the dexterous hand wrist can be approximated as a six-degree-of-freedom mechanical arm, but the three axes at an end of this arm are not orthogonal, and there is no analytical solution.

How to provide a fusion system of a four-degree-of-freedom mechanical arm and a dexterous hand wrist and a motion control method is a technical problem that needs to be solved urgently.

SUMMARY

The technical problem to be solved by the present disclosure is to overcome the deficiencies of the related art, to propose a fusion system of a mechanical arm and a dexterous hand and a motion control method.

The solution of the present disclosure is as follows.

A fusion system of a mechanical arm and a dexterous hand includes a four-degree-of-freedom mechanical arm, a dexterous hand wrist and a dexterous hand. The dexterous hand wrist is mounted at an end of the four-degree-of-freedom mechanical arm, and a dexterous hand palm is mounted on the dexterous hand wrist. The dexterous hand wrist and the four-degree-of-freedom mechanical arm are connected by an electronic circuit.

Preferably, the dexterous hand wrist is a two-degree-of-freedom parallel mechanism, and includes two motors, two push rods and two servo position controllers; and the two servo position controllers are an active servo position controller and a slave servo position controller, the two motors include a first motor and a second motor, the two push rods include a first push rod and a second push rod; the active servo position controller is configured to drive a motion of the first motor, and the motion of the first motor motion drives a motion of the first push rod; the slave servo position controller is configured to drive a motion of the second motor, and the motion of the second motor drives a motion of the second push rod; and an end of the first push rod and an end of the second push rod are simultaneously connected to the dexterous hand palm.

Preferably, the two motors adopt synchronous differential control mode, and the two motors drive the motion of the two push rods to realize a pitching motion and a yaw rotation of the dexterous hand.

When the two push rods move in a same direction, the dexterous hand performs the pitching motion, and a pitch angle range is −70 degrees to 70 degrees; and when the two push rods move in opposite directions, the dexterous hand performs the yaw rotation, and a yaw angle range is −45 degrees to 45 degrees.

A motion control method for a fusion system of a mechanical arm and a dexterous hand includes:

regarding a fusion system of a four-degree-of-freedom mechanical arm and a dexterous hand as a six-axis serial mechanical arm, taking a center of a base of the four-degree-of-freedom mechanical arm as an origin, establishing a coordinate system of the mechanical arm by a D-H method, and giving D-H parameters of each joint and link of the mechanical arm; according to joint angles $\theta_1$, $\theta_2$, $\theta_3$, $\theta_4$ of the four-degree-of-freedom mechanical arm and joint angles $\theta_5$, $\theta_6$ of the dexterous hand wrist, obtaining a position and attitude matrix $$T = \begin{bmatrix} R & P \\ 0 & 1 \end{bmatrix}$$

of an end of a dexterous hand wrist through a positive kinematics method of the fusion system of the four-degree-of-freedom mechanical arm and the dexterous hand wrist T, to realize a forward motion control of the fusion system, wherein R represents a rotation matrix at the end of the dexterous hand wrist and P represents a position matrix at the end of the dexterous hand wrist; and if the position and attitude $$T = \begin{bmatrix} R & P \\ 0 & 1 \end{bmatrix}$$

of the end of the dexterous hand wrist is known, obtaining joint angles $\theta_1, \theta_2, \theta_3, \theta_4, \theta_5, \theta_6$ of the fusion system through an inverse kinematic numerical solution method of the fusion system of the four-degree-of-freedom mechanical arm and the dexterous hand wrist, obtaining a control instruction according to the joint angles, and sending the control instruction to a servo position controller, to drive the end of the dexterous hand wrist to a predetermined position and attitude.

Preferably, when the forward motion of the fusion system is controlled, the position and attitude of the end of the dexterous hand wrist is $$T = {}^0_6T = {}^0_1T_2^{*1}T_3^{*2}T_4^{*3}T_5^{*4}T_6^{*5}T,$$

in which, $${}^0_1T$$

is a coordinate transformation matrix from a base coordinate system of the mechanical arm to a first joint of the mechanical arm in the fusion system;

$${}^1_2T$$

is a coordinate transformation matrix from the first joint of the mechanical arm to a second joint of the mechanical arm in the fusion system;

$${}^2_3T$$

is a coordinate transformation matrix from the second joint of the mechanical arm to a third joint of the mechanical arm in the fusion system;

$${}^3_4T$$

is a coordinate transformation matrix from the third joint of the mechanical arm to a fourth joint of the mechanical arm in the fusion system;

$${}^4_5T$$

is a coordinate transformation matrix from the fourth joint of the mechanical arm to a first joint of the dexterous hand wrist in the fusion system;

$${}^5_6T$$

is a coordinate transformation matrix from the first joint of the dexterous hand wrist to a second joint of the dexterous hand wrist in the fusion system; and $${}^0_6T$$

is a coordinate transformation matrix from the base coordinate system of the mechanical arm to the end of the dexterous hand wrist in the fusion system.

$${}^0_1T = \begin{bmatrix} c1 & -s1 & 0 & 0 \\ s1 & c1 & 0 & 0 \\ 0 & 0 & 1 & 0 \\ 0 & 0 & 0 & 1 \end{bmatrix} \quad {}^1_2T = \begin{bmatrix} c2 & -s2 & 0 & 0 \\ 0 & 0 & 1 & d_2 \\ -s2 & -c2 & 0 & 0 \\ 0 & 0 & 0 & 1 \end{bmatrix} \quad {}^2_3T = \begin{bmatrix} c3 & -s3 & 0 & a_2 \\ s3 & c3 & 0 & 0 \\ 0 & 0 & 1 & d_3 \\ 0 & 0 & 0 & 1 \end{bmatrix}$$

$${}^3_4T = \begin{bmatrix} c4 & -s4 & 0 & 0 \\ 0 & 0 & -1 & d_4 \\ s4 & c4 & 0 & 0 \\ 0 & 0 & 0 & 1 \end{bmatrix} \quad {}^4_5T = \begin{bmatrix} c5 & -s5 & 0 & 0 \\ 0 & 0 & -1 & d_5 \\ s5 & c5 & 0 & 0 \\ 0 & 0 & 0 & 1 \end{bmatrix}$$

$${}^5_6T = \begin{bmatrix} c6 & -s6 & 0 & 0 \\ 0 & 0 & 1 & 0 \\ -s6 & -c6 & 0 & 0 \\ 0 & 0 & 0 & 1 \end{bmatrix}$$

in which, dj is a link distance between a $j^{th}$ joint and a $(j-1)^{th}$ joint, j=2, 3, 4, 5; $a_p$ is a link length of a $p^{th}$ joint, p=2; and si is an $i^{th}$ joint angle sine, ci is an $i^{th}$ joint angle cosine, and i=1, 2, 3, 4, 5, 6.

si=sin $\theta_i$, ci=cos $\theta_i$○

Preferably, the joint angle $\theta_6$ is solved numerically in an iterative manner.

A formula for a $(k+1)^{th}$ iteration of $\theta_6$ is as follows:

$$\theta_{6(k+1)} = \theta_{6(k)} - \frac{f(\theta_{6(k)})(\theta_{6(k)} - \theta_{6(k-1)})}{f(\theta_{6(k)}) - f(\theta_{6(k-1)})}$$

in which $\theta_{6(k+1)}$ is a result of the $(k+1)^{th}$ iteration of $\theta_6$ $\theta_{6(k)}$ is a result of a $k^{th}$ iteration of $\theta_6$, $\theta_{6(k-1)}$ is a result of a $(k-1)^{th}$ iteration of $\theta_6$, $f(\theta_{6(k+1)})$ is an inverse kinematics formula at $\theta_{6(k+1)}$, $f(\theta_{6(k)})$ is an inverse kinematics formula at $\theta_{6(k)}$, and $f(\theta_{6(k-1)})$ is an inverse kinematics formula at $\theta_{6(k-1)}$.

The beneficial effects of the present disclosure compared with the related art are as follows.

(1) The present disclosure designs an orthogonal two-degree-of-freedom dexterous hand wrist, which only occupies a space for a single joint, and effectively guarantees the reliability by the synchronous differential control of redundant dual motors.

(2) The present disclosure adopts a six-degree-of-freedom series-parallel mechanism that combines a four-degree-of-freedom mechanical arm and a dexterous hand two-degree-of-freedom wrist, to carry out a fusion control of the mechanical arm and the dexterous hand, the six-degree-of-freedom arm composed of the four-degree-of-freedom mechanical arm and the two joints of the dexterous hand wrist does not satisfy the end three axes intersecting at a point, and there is no inverse kinematic analytical solution, only a numerical solution, so an inverse kinematics numerical solution method based on this arm type is designed, which is suitable for the numerical solution of all serial mechanical arms.

(3) The present disclosure decouples two coupling joints of the dexterous hand wrist and treats them as two independent mechanical arm joints, namely joint 5 and joint 6, so that through the control method of the present disclosure, the complex parallel mechanism of the dexterous hand wrist can be fused with the mechanical arm and is controlled according to a control method for a six-degree-of-freedom serial mechanical arm.

(4) The six-degree-of-freedom series-parallel mechanism that combines the four-degree-of-freedom mechanical arm and the dexterous hand two-degree-of-freedom wrist in the present disclosure has multi-degree-of-freedom redundancy, so that the mechanical arm can be made to realize the rotation of the five-finger dexterous hand without wide range motion.

DETAILED DESCRIPTION OF THE DISCLOSURE

The present disclosure is further elaborated below in conjunction with the accompanying drawings.

Under the premise of not modifying a dexterous hand, the present disclosure designs a both beautiful and practical fusion system of a mechanical arm and a dexterous hand, saves research and development costs, shortens a research and development cycle; and at the same time, proposes an inverse kinematics numerical solution solving method to realize the motion control of a fusion system of a mechanical arm and a dexterous hand.

Figure 3:
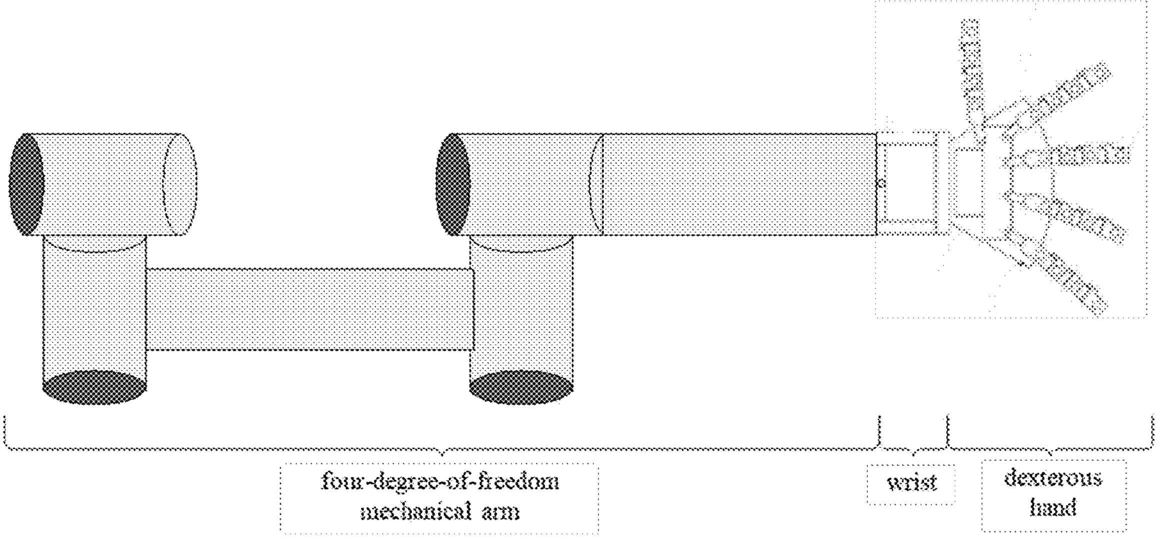
FIG. 3 shows a configuration of a four-degree-of-freedom mechanical arm combined with a dexterous hand dual-degree-of-freedom wrist.

A fusion system of a mechanical arm and a dexterous hand is shown in FIG. 3, which includes a four-degree-of-freedom mechanical arm, a dexterous hand wrist (a single-joint spatial orthogonal two-degree-of-freedom integrated wrist), and a dexterous hand. The dexterous hand two-degree-of-freedom wrist is mounted at an end of the four-degree-of-freedom mechanical arm, and the two are connected by an electronic circuit for communication and power supply. The dexterous hand palm is mounted on the dexterous hand wrist. A motion control method for the fusion system of a four-degree-of-freedom mechanical arm and a dexterous hand wrist includes a control method for a single-joint spatial orthogonal two-degree-of-freedom integrated wrist, a positive kinematics method for the fusion system of the mechanical arm and the dexterous hand, and an inverse kinematics method for the fusion system of the mechanical arm and the dexterous hand.

Figure 2:
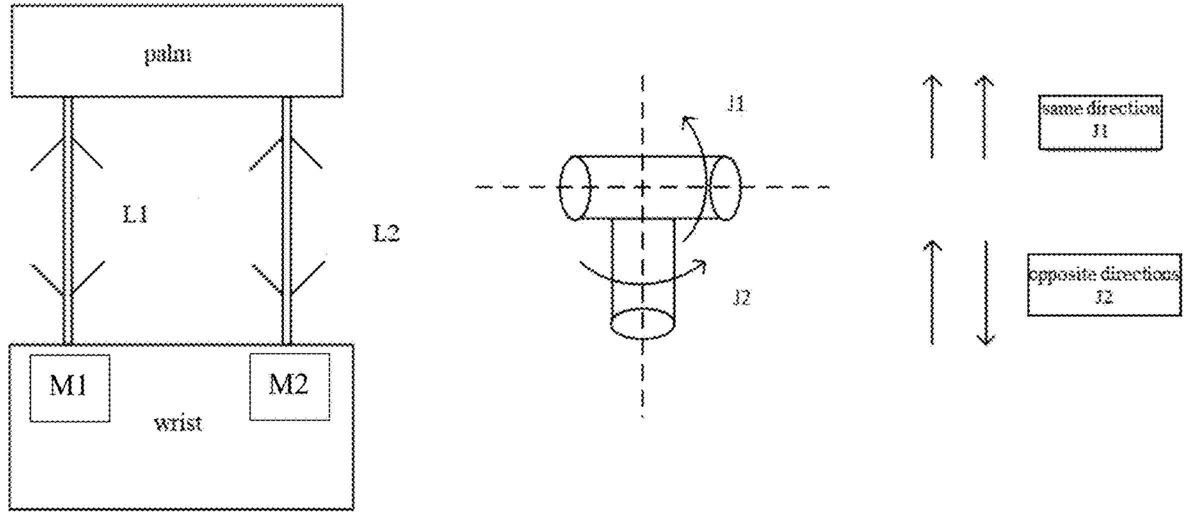
FIG. 2 shows a single-joint spatial orthogonal two-degree-of-freedom integrated wrist.

As shown in FIG. 2, the single-joint spatial orthogonal two-degree-of-freedom integrated wrist adopts dual motors M1, M2 for synchronous differential control. A pitching motion and a yaw rotation of the dexterous hand are realized by using the dual motors to push the double push rods L1 and L2. When the double push rods L1 and L2 move in a same direction, the dexterous hand performs the pitching motion, the wrist can be regarded as a joint J1, and a pitch angle range of the joint J1 is −70 degrees to 70 degrees. When the double push rods L1 and L2 move in opposite directions, the dexterous hand performs the yaw rotation, the wrist can be regarded as a joint J2, and a yaw angle of the joint J2 is −45 degrees to 45 degrees. One motor m1 of the dual motors is driven by a servo position controller A (active), and the other motor m2 is driven by a servo position controller B (slave).

Figure 1:
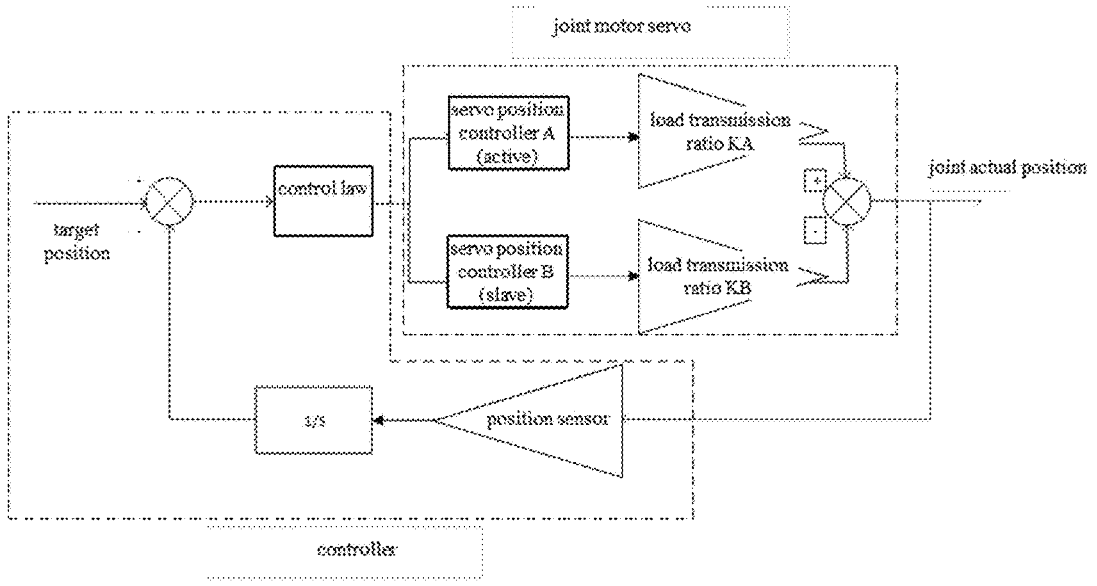
FIG. 1 is a schematic diagram of a partial control of a dexterous hand wrist.

The control method for the dexterous hand two-degree-of-freedom wrist is shown in FIG. 1, a target position of the dexterous hand is input; the fusion system calculates a control instruction through a control law, and sends the control instruction to the servo position controller A (active) and the servo position controller B (slave); and the servo controller then combines the servo control instruction with a load transmission ratio KA or KB to obtain a drive instruction of the corresponding motor. An actual position of the joint is fed back to the fusion system through a position sensor and then through an integrator operation, to achieve a large closed-loop control.

A motion control method for a fusion system of a four-degree-of-freedom mechanical arm and a dexterous hand dual-degree-of-freedom wrist includes the steps as follows.

(1) The fusion system of the four-degree-of-freedom mechanical arm and the dexterous hand wrist fusion system is regarded as a six-axis serial mechanical arm. A center of a base of the mechanical arm is taken as the origin, a coordinate system is established by using a D-H method, and D-H parameters of each link and joint are given, in which the D-H parameters of the joint included joint angles $\theta_1$, $\theta_2$, $\theta_3$, $\theta_4$ of the four-degree-of-freedom mechanical arm, and joint angles $\theta_5$, $\theta_6$ of the dexterous hand wrist.

(2) According to the known joint angles $\theta_1$, $\theta_2$, $\theta_3$, $\theta_4$ of the four-degree-of-freedom mechanical arm, and the joint angles $\theta_5$, $\theta_6$ of the wrist, a position and attitude $$T=\begin{bmatrix} R & P \\ 0 & 1 \end{bmatrix}$$

of the end of the dexterous hand wrist is obtained through a positive kinematics method of the fusion system of the four-degree-of-freedom mechanical arm and the dexterous hand wrist, to realize a forward motion control of the system. R represents a rotation matrix at the end of the dexterous hand wrist and P represents a position matrix at the end of the dexterous hand wrist.

The transformation matrices between coordinate systems of the fusion system of the four-degree-of-freedom mechanical arm and the dexterous hand wrist are as follows:

$$ {}_1^0T=\begin{bmatrix} c1 & -s1 & 0 & 0 \\ s1 & c1 & 0 & 0 \\ 0 & 0 & 1 & 0 \\ 0 & 0 & 0 & 1 \end{bmatrix} \quad {}_2^1T=\begin{bmatrix} c2 & -s2 & 0 & 0 \\ 0 & 0 & 1 & d_2 \\ -s2 & -c2 & 0 & 0 \\ 0 & 0 & 0 & 1 \end{bmatrix} \quad {}_3^2T=\begin{bmatrix} c3 & -s3 & 0 & a_2 \\ s3 & c3 & 0 & 0 \\ 0 & 0 & 1 & d_3 \\ 0 & 0 & 0 & 1 \end{bmatrix} $$

$$ {}_4^3T=\begin{bmatrix} c4 & -s4 & 0 & 0 \\ 0 & 0 & -1 & d_4 \\ s4 & c4 & 0 & 0 \\ 0 & 0 & 0 & 1 \end{bmatrix} \quad {}_5^4T=\begin{bmatrix} c5 & -s5 & 0 & 0 \\ 0 & 0 & -1 & d_5 \\ s5 & c5 & 0 & 0 \\ 0 & 0 & 0 & 1 \end{bmatrix} $$

-continued $$ {}_6^5T = \begin{bmatrix} c6 & -s6 & 0 & 0 \\ 0 & 0 & 1 & 0 \\ -s6 & -c6 & 0 & 0 \\ 0 & 0 & 0 & 1 \end{bmatrix} $$

$$ {}_6^0T = {}_1^0T * {}_2^1T * {}_3^2T * {}_4^3T * {}_5^4T * {}_6^5T, $$

in which $$ {}_1^0T $$

is a coordinate transformation matrix from a base coordinate system of the mechanical arm to a first joint of the mechanical arm in the fusion system;

$$ {}_2^1T $$

is a coordinate transformation matrix from the first joint of the mechanical arm to a second joint of the mechanical arm in the fusion system;

$$ {}_3^2T $$

is a coordinate transformation matrix from the second joint of the mechanical arm to a third joint of the mechanical arm in the fusion system;

$$ {}_4^3T $$

is a coordinate transformation matrix from the third joint of the mechanical arm to a fourth joint of the mechanical arm in the fusion system;

$$ {}_5^4T $$

is a coordinate transformation matrix from the fourth joint of the mechanical arm to a first joint of the dexterous hand wrist in the fusion system;

$$ {}_6^5T $$

is a coordinate transformation matrix from the first joint of the dexterous hand wrist to a second joint of the dexterous hand wrist in the fusion system; and $$ {}_6^0T $$

is a coordinate transformation matrix from the base coordinate system of the mechanical arm to the end of the dexterous hand wrist in the fusion system.

In which, dj is a link distance between a $j^{th}$ joint and a $(j-1)^{th}$ joint, j=2, 3, 4, 5; $a_p$ is a link length of a $p^{th}$ joint, p=2; and si is an $i^{th}$ joint angle sine, ci is an $i^{th}$ joint angle cosine, and i=1, 2, 3, 4, 5, 6. si=sin $\theta_i$, ci=cos $\theta_i$, and $\theta_i$ is an $i^{th}$ joint angle.

A first joint angle range is $-90°<\theta_1<90°$. A second joint angle range is $0°<\theta_2<90°$. A third joint angle range is $-120°<\theta_3<0°$. A fourth joint angle range is $0°<\theta_4<180°$. A fifth joint angle range is $-70°<\theta_5<70°$. A sixth joint angle range is $-45°<\theta_6<45°$.

(3) According to the known position and attitude $$ \begin{bmatrix} R & P \\ 0 & 1 \end{bmatrix} $$

at the end of the system, because the three axes at the end of the system are not orthogonal and there is no analytical solution, the joint angles $\theta_1$, $\theta_2$, $\theta_3$, $\theta_4$, $\theta_5$, $\theta_6$ of the system is obtained through an inverse kinematic numerical solution method of the fusion system of the four-degree-of-freedom mechanical arm and the dexterous hand wrist, to realize a reverse motion control of the system.

$\theta_1$, $\theta_2$, $\theta_3$, $\theta_4$, and $\theta_5$ are obtained by solving the robot inverse kinematics, but $\theta_6$ cannot be solved analytically, so only the numerical solution can be obtained.

Substantially, the numerical solution is guessing and iterating until the error is small enough, or until it is thought to have given up. The common Newton-Raphson algorithm is used in this method because it is conceptually simple and has a quadratic convergence rate if the initial guess is "close enough" to the solution. The Newton iterative method needs to calculate a first order derivative of f(x) at $x_k$, and for complex functions, especially multivariate implicit functions, finding the derivative or partial derivative is relatively cumbersome and complex, an approximate cut line method is used with the following equation, $$ x_{k+1} = x_k - \frac{f(x_k)(x_k - x_{k-1})}{f(x_k) - f(x_{k-1})}. $$

However, there is no guarantee that the algorithm will converge or meet the application requirements fast enough and return only one solution. In order to produce a solution for a wide range of possible postures, different initial conditions must be used.

Therefore, in the present disclosure, a solution formula of the $(k+1)^{th}$ joint angle $\theta_6$ is as follows:

$$ \theta_{6(k+1)} = \theta_{6(k)} - \frac{f(\theta_{6(k)})(\theta_{6(k)} - \theta_{6(k-1)})}{f(\theta_{6(k)}) - f(\theta_{6(k-1)})} $$

In which, $\theta_{6(k+1)}$ is a result of the $(k+1)^{th}$ iteration of $\theta_6$, $\theta_{6(k)}$ is a result of the $k^{th}$ iteration of $\theta_6$, $\theta_{6(k-1)}$ is a result of the $(k-1)^{th}$ iteration of $\theta_6$, $f(\theta_{6(k+1)})$ is an inverse kinematics formula at $\theta_{6(k+1)}$, $f(\theta_{6(k)})$ is an inverse kinematics formula at $\theta_{6(k)}$, and $f(\theta_{6(k-1)})$ is an inverse kinematics formula at $\theta_{6(k-1)}$.

The present disclosure adopts the six-degree-of-freedom series-parallel mechanism that combines the four-degree-of-freedom mechanical arm and the dexterous hand two-degree-of-freedom wrist to carry out the fusion control of the mechanical arm and the dexterous hand, the six-degree-of-freedom arm composed of the four-degree-of-freedom mechanical arm and the two joints of the dexterous hand wrist does not satisfy the end three-axes intersecting at a point, and there is no inverse kinematic analytical solution, only a numerical solution, so a kind of inverse kinematic numerical solution method based on this arm type is designed, which is suitable for the numerical solution of all serial mechanical arms.

The six-degree-of-freedom series-parallel mechanism that combines the four-degree-of-freedom mechanical arm with the dexterous hand two-degree-of-freedom wrist in the present disclosure has multi-degree-of-freedom redundancy, so that the mechanical arm can be made to realize the rotation of the five-finger dexterous hand without wide range motion.

The contents not described in detail in the description of the present disclosure belong to the well-known technology of professional and technical personnel in the art.

What is claimed is:

1. A fusion system of a mechanical arm and a dexterous hand, comprising:

a four-degree-of-freedom mechanical arm;

a dexterous hand wrist mounted at an end of the four-degree-of-freedom mechanical arm; and a dexterous hand mounted on the dexterous hand wrist, wherein the dexterous hand wrist and the four-degree-of-freedom mechanical arm are connected by an electronic circuit, wherein the dexterous hand wrist is a two-degree-of-freedom parallel mechanism, and comprises two motors, two push rods and two servo position controllers; and wherein the two servo position controllers are an active servo position controller and a slave servo position controller, the two motors comprise a first motor and a second motor, and the two push rods comprise a first push rod and a second push rod; the active servo position controller is configured to drive a motion of the first motor, and the motion of the first motor drives a motion of the first push rod; the slave servo position controller is configured to drive a motion of the second motor, and the motion of the second motor drives a motion of the second push rod; and an end of the first push rod and an end of the second push rod are simultaneously connected to a dexterous hand palm.

2. The fusion system of the mechanical arm and the dexterous hand according to claim 1, wherein the two motors adopt a synchronous differential control mode, and the two motors drive the motion of the two push rods to realize a pitching motion and a yaw rotation of the dexterous hand.

3. The fusion system of the mechanical arm and the dexterous hand according to claim 2, wherein when the two push rods move in a same direction, the dexterous hand performs the pitching motion, and a pitch angle range is −70 degrees to 70 degrees; and when the two push rods move in opposite directions, the dexterous hand performs the yaw rotation, and a yaw angle range is −45 degrees to 45 degrees.

* * * * *